United States Patent
Yamato

(10) Patent No.: US 9,887,038 B2
(45) Date of Patent: Feb. 6, 2018

(54) BLANKING DIE APPARATUS AND METHOD FOR MANUFACTURING LAMINATED IRON CORE

(71) Applicant: MITSUI HIGH-TEC, INC., Kitakyushu-shi, Fukuoka (JP)

(72) Inventor: Shigetoshi Yamato, Fukuoka (JP)

(73) Assignee: MITSUI HIGH-TEC, INC., FUKUOKA (JP)

( * ) Notice: Subject to any disclaimer, the term of this patent is extended or adjusted under 35 U.S.C. 154(b) by 437 days.

(21) Appl. No.: 14/574,844

(22) Filed: Dec. 18, 2014

(65) Prior Publication Data

US 2015/0187492 A1    Jul. 2, 2015

(30) Foreign Application Priority Data

Dec. 26, 2013   (JP) .................. 2013-269181

(51) Int. Cl.
*H01F 41/02*   (2006.01)
*H02K 15/02*   (2006.01)
*B21D 28/22*   (2006.01)

(52) U.S. Cl.
CPC ......... *H01F 41/0233* (2013.01); *B21D 28/22* (2013.01); *H02K 15/024* (2013.01); *Y10T 29/49078* (2015.01); *Y10T 29/5142* (2015.01)

(58) Field of Classification Search
CPC ........ B21D 28/22; B21D 43/05; B21D 45/04; B21D 28/02; H02K 15/02; H02K 15/024
See application file for complete search history.

(56) References Cited

U.S. PATENT DOCUMENTS 5,359,763 A * 11/1994 Neuenschwander .. B21D 28/22
29/33 Q

FOREIGN PATENT DOCUMENTS

| CN | 203076474 | 7/2013 |
|---|---|---|
| JP | 60-121429 | 8/1985 |
| JP | 11-104897 | 4/1999 |
| JP | 2003-088925 | 3/2003 |
| JP | 2003-200296 | 7/2003 |

(Continued)

OTHER PUBLICATIONS

Office Action issued in China Counterpart Patent Appl. No. 201410831974.4, dated Oct. 31, 2016 , along with an English translation thereof.

(Continued)

*Primary Examiner* — Livius R Cazan
(74) *Attorney, Agent, or Firm* — Greenblum & Bernstein, P.L.C.

(57) ABSTRACT

A blanking die apparatus includes a lower die in which a plurality of working stations are arranged, and an upper the which moves upward and downward with respect to the lower die. A progressively fed sheet is sequentially blanked or stamped out respectively in the working stations to form iron core pieces, and then to laminate the iron core pieces to form a laminated iron core. The lower die includes a lifter part which lifts the sheet from the lower die when the sheet is progressively fed. The lifter part first lifters installed in an outer peripheral area in each of the working stations, and second lifters installed on an upper surface of a blank die which has a blanking hole formed for blanking the iron core pieces in an external form, or on an upper surface of a blank die holder.

8 Claims, 6 Drawing Sheets

(56) References Cited

FOREIGN PATENT DOCUMENTS

| | | | |
|---|---|---|---|
| JP | 2003200296 A | * | 7/2003 |
| JP | 2011-125884 | | 6/2011 |
| JP | 2013-031874 | | 2/2013 |

OTHER PUBLICATIONS

Office Action issued in Japan Counterpart Patent Appl. No. 2013-269181, dated Aug. 8, 2017, along with an English translation thereof.

\* cited by examiner

BLANKING DIE APPARATUS AND METHOD FOR MANUFACTURING LAMINATED IRON CORE

CROSS REFERENCE TO RELATED APPLICATIONS

This application is based upon and claims the benefit of priority of Japanese Patent Application No. 2013-269181 filed on Dec. 26, 2013, the contents of which are incorporated herein by reference in its entirety.

BACKGROUND OF THE INVENTION

1. Field of the Invention

The present invention relates to a blanking die apparatus which blanks iron core pieces from a progressively fed sheet to form a laminated iron core and a method for manufacturing the laminated iron core by using the blanking die apparatus.

2. Description of the Related Art

For instance, a laminated iron core which forms a stator or a rotor of a motor is manufactured as follows. A belt-shaped sheet such as an electromagnetic steel plate is progressively fed to a blanking die apparatus, sequentially blanked or stamped out in working stations respectively arranged along a feeding direction of the sheet to form iron core pieces of desired forms and the obtained iron core pieces are rotated and stacked. Here, as shown in FIG. 5, a sheet 75 is moved in the blanking die apparatus (in an upper part of a lower die 76) in a state where the sheet 75 is lifted by using lifters 77 arranged in the lower die 76 of the blanking die apparatus. Guide parts 78 are respectively provided at both sides in a direction of width of the progressively fed sheet 75 to prevent a shift of the sheet 75 in the width direction.

In recent years, the width of the sheet used to manufacture the iron core pieces is increased so as to meet an enlargement of the laminated iron core with a large size of the motor and the thickness of the sheet is decreased. Accordingly, rigidity of the sheet is extremely lowered as compared with a sheet in the past. As a result, a problem (a failure in feeding) arises that when the sheet is progressively fed in the state where the sheet is lifted by the lifters in the blanking die apparatus, the sheet is bent downward, and the sheet is caught in, for instance, a blank die of the lower die during a feeding operation of the sheet. This problem frequently arises in a working station which blanks the sheet in an external form where the rigidity of the sheet is especially reduced. Thus, a countermeasure for the problem is required.

Thus, as shown in FIG. 6, in a lower die 80 of the blanking die apparatus, when a plurality of lifters 86 to 92 are provided respectively in peripheries of blanking holes 81 to 85 provided in the working stations arranged along the feeding direction of the sheet (not shown in the drawing), a lifting height of the lifters 92 arranged in the periphery of the blanking hole 85 is set to be larger than a lifting height of the lifters 86 nearest to an inlet side in order to lift up more an area of the sheet located above the blanking hole 85. Thus, even when the rigidity of the sheet is extremely reduced so that the sheet is liable to be bent, the sheet is prevented to coming into contact with the periphery of the blanking hole 85. See JP-A-2003-200296, for example.

SUMMARY OF THE INVENTION

However, when the iron core pieces blanked into a blank die holder through the blanking hole 85 of the blank die are rotated and stacked in the blank die holder, since the blank die holder is rotated together with the blank die during a rotating and stacking operation of the iron core pieces, the lifters 92 need to be provided in areas outside the blank die holder. Accordingly, spaces between the lifters 92 which support the sheet above the blanking hole 85 are widened to increase an amount of bending of the sheet. Thus, a fear arises that even when the sheet is lifted high by the lifters 92, the sheet may come into contact with the periphery of the blanking hole 85 (namely, the blank die), or the sheet may come into contact with holes of upper surfaces of rotating members (the blank die and the blank die holder) during the rotation of the blank die. Further, since the sheet is lifted high by the lifters 92, a mechanical damage such as scratches or abrasion is liable to be generated in contact parts of the lifters 92 and the sheet. Further, a problem also arises that dents are generated in the laminated iron core (a product) by residue of the sheet generated by the mechanical damage.

The present invention is devised by considering the above-described circumstances and it is a non-limited object to provide a blanking die apparatus which can prevent a sheet from being caught in a lower die or residue of the sheet from being generated during a feeding operation of the sheet so that the productivity and the quality of a laminated iron core may be improved and a method for manufacturing the laminated iron core by using the blanking die apparatus.

A first aspect of the present invention provides a blanking die apparatus including: a lower die in which a plurality of working stations are arranged; an upper die which is opposed to the lower die, arranged above the lower die and moves upward and downward with respect to the lower die; and a mechanism which sequentially blanks or stamps out a progressively fed sheet respectively in the working stations to form iron core pieces of a desired form, and then laminates the iron core pieces to form a laminated iron core, wherein the lower die includes a lifter part which lifts the sheet from an upper surface position of the lower die when the sheet is progressively fed, the lifter part including: a first group of lifters that includes a plurality of first lifters installed in an outer peripheral area in each of the working stations; and a second group of lifters that includes second lifters installed on an upper surface of a blank die which has a blanking hole formed for blanking the iron core pieces in an external form, or on an upper surface of a blank die holder which holds the blank die.

The blanking die apparatus may be configured so that the second lifters are arranged in an annular way around the blanking hole.

The blanking die apparatus may be configured so that an area of the second lifter which comes into contact with the sheet is smaller than an area of the first lifter which comes into contact with the sheet.

The blanking die apparatus may be configured so that the second lifter has, in a side view, a trapezoidal form in which a width is decreased toward an tip end part of the second lifter abutting on the sheet or a circular arc shape which comes into contact with the sheet at one point.

The blanking die apparatus may be configured so that the iron core pieces are rotated and stacked for each of the iron core pieces or for some of the iron core pieces.

The blanking die apparatus may be configured so that a lifting height of the second lifter is smaller than a lifting height of the first lifter.

A second aspect of the present invention provides a method for manufacturing a laminated iron core, the method including: progressively feeding a sheet to a blanking die apparatus including a lower die in which a plurality of working stations are arranged and an upper die which is opposed to the lower die, arranged above the lower die and moves upward and downward with respect to the lower die; sequentially blanking or stamping out the sheet respectively in the working stations to form iron core pieces of a desired form, and then laminating the iron core pieces to form a laminated iron core, wherein the lower die includes a lifter part which lifts the sheet from an upper surface position of the lower die when the sheet is progressively fed and a guide part which prevents the progressively fed sheet from shifting in a width direction of the sheet, and the lifter part includes a first group of lifters including first lifters installed in an outer peripheral area in each of the working stations and a second group of lifters including second lifters installed in a periphery of a blanking hole for blanking the iron core pieces in an external form, and a lifting distance of the second lifters is set to be shorter than a lifting distance of the first lifters, so that the sheet is progressively fed in a state where a part of the sheet is supported by the second lifters.

The method may be configured so that the second lifters are arranged in an annular way around the blanking hole on an upper surface of a blank die having the blanking hole or on an upper surface of a blank die holder which holds the blank die.

In the blanking die apparatus according to the first aspect of the present invention and the method for manufacturing the laminated iron core according to the second aspect of the present invention, since the second lifters are arranged on the upper surface of the blank die which has the blanking hole for blanking the iron core pieces in the external form or on the upper surface of the blank die holder which holds the blank die, a periphery of the hole of the sheet which is formed by blanking the iron core piece in the external form can be constantly supported. An amount of bending in an area is reduced where the iron core piece is blanked from the sheet so that rigidity of the sheet is deteriorated. Thus, the sheet can be prevented from being caught in the blanking hole.

In the blanking die apparatus according to the first aspect of the present invention, when the second lifters are arranged in the annular way around the blanking hole for blanking the iron core pieces in the external form, a part in the vicinity of the hole the sheet which is formed by blanking the iron core piece in the external form can be directly supported and an amount of bending of the sheet which exists above the blanking hole can be assuredly reduced.

In the blanking die apparatus according to the first aspect of the present invention, when the area of the second lifter which comes into contact with the sheet is smaller than the area of the first lifter which comes into contact with the sheet, the sheet can be stably held by the first lifters. Further, a friction between the second lifter and the sheet can be reduced during a rotating and stacking operation. A deformation such as a swell or a bending can be prevented from being generated in the sheet arranged above the lower die.

In the blanking die apparatus according to the first aspect of the present invention, when the second lifter which comes into contact with the sheet has, in a side view, the trapezoidal form in which the width is gradually decreased toward the tip end part of the second lifter which abuts on the sheet or the circular arc shape which comes into contact with the sheet at one point, the second lifter can be smoothly moved relative to the sheet and the deformation of the sheet caused by the movement of the second lifter can be assuredly prevented.

In the blanking die apparatus according to the first aspect of the present invention, when the lifting height of the second lifter is lower than the lifting height of the first lifter, an own weight of the sheet applied to the second lifter can be reduced. Further, a mechanical damage such as scratches or abrasion can be prevented from being generated in contact parts of the second lifters and the sheet. As a result, when the sheet is fed, the sheet is prevented from being caught in the lower die or residue of the sheet is prevented from being generated. Thus, the productivity and the quality of the laminated iron core can be improved.

In the method for manufacturing the laminated iron core according to the second aspect of the present invention, when the second lifters are arranged in the annular way around the blanking hole on the upper surface of the blank die which has the blanking hole or on the upper surface of the blank die holder which holds the blank die, if the iron core pieces are rotated and stacked, the same positions can be constantly supported by the second lifters relative to the sheet, no influence is applied to a feeding operation of the sheet after the rotating and stacking operation (the deformation such as the swell or the bending is not generated in the sheet).

DETAILED DESCRIPTION OF THE EXEMPLARY EMBODIMENTS

Subsequently, by referring to the attached drawings, an exemplary embodiment which embodies the present invention will be described to understand the present invention.

Figure 1:
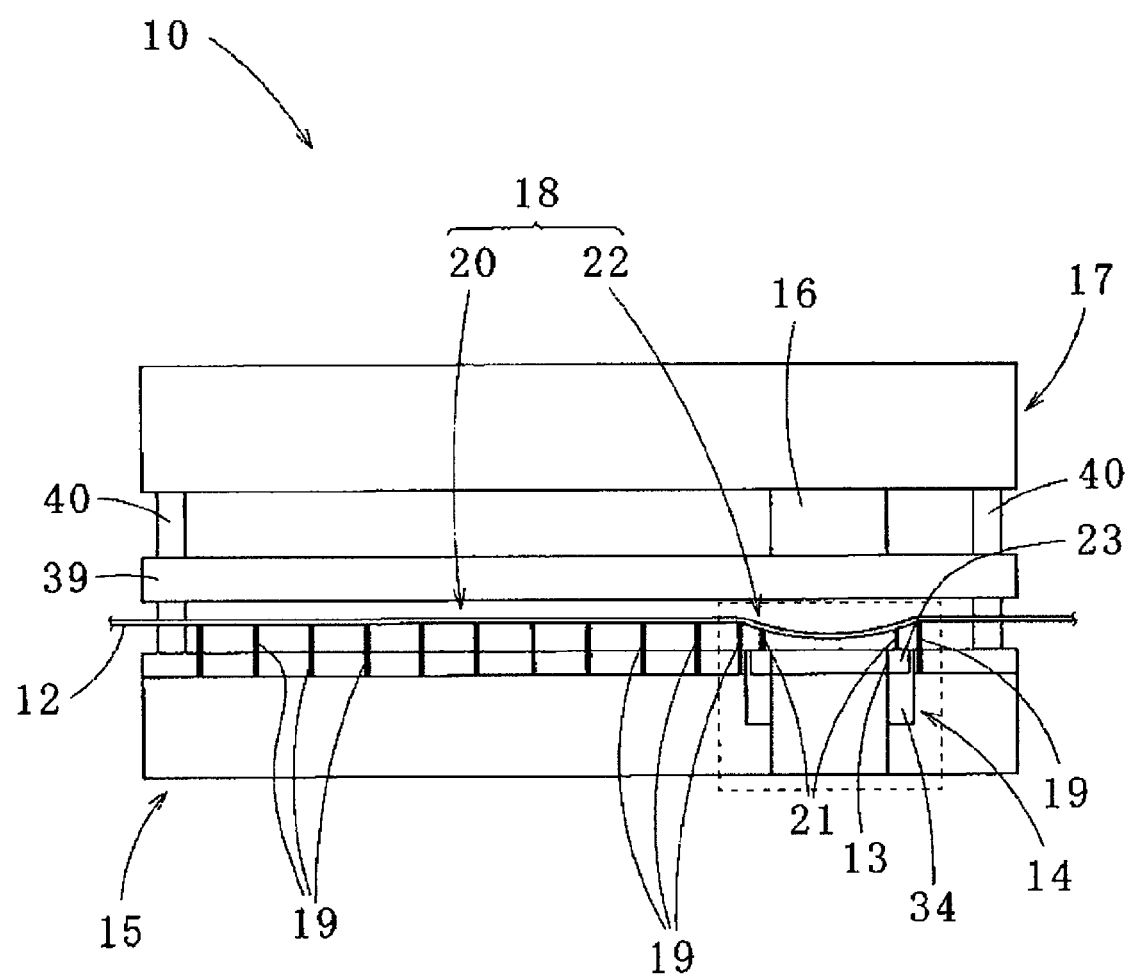
FIG. 1 is a side view of a blanking die apparatus according to one exemplary embodiment of the present invention.

As shown in FIG. 1, a blanking die apparatus 10 according to one exemplary embodiment of the present invention includes a lower die 15 in which are arranged a plurality of working stations (not shown in the drawing) for forming patterns respectively having blanking holes which form the patterns of iron core pieces 11 (see FIG. 2) that form a laminated iron core by sequentially carrying out a blanking or stamping work on a belt shaped sheet 12 and a working station 14 of a final stage including a blanking hole 13 for blanking in the external form that blanks areas where the patterns are completed from the sheet 12 in the external forms to form the iron core pieces 11. Further, the blanking die apparatus 10 includes an upper die 17 which moves upward and downward with respect to the lower die 15 and is opposed to the lower die 15 and arranged above the lower die 15, and has blanking punches (not shown in the drawing)

respectively paired with the blanking holes of the plurality of working stations for forming the patterns and a blanking punch 16 paired with the blanking hole 13 for blanking in the external form in the working station 14. A stripper holder 39 holds a stripper plate (not shown in the drawing) which presses the sheet 12 to the lower die 15 when the blanking or stamping work (the pattern is formed and the external form is blanked or stamped out) is carried out on the sheet 12. A guide post 40 guides the upward and downward movement of the upper die 17. Hereinafter, the above-described members will be described below in detail.

As shown in FIG. 1, in the lower die 15 of the blanking die apparatus 10, a lifter part 18 is provided to lift the sheet 12 from an upper surface position of the lower die 15 when the sheet 12 is progressively fed. The lifter part 18 includes a first group of lifters 20 having a plurality of first lifters 19 installed in an outer peripheral area in each of the plurality of working stations for forming the patterns and the working station 14 and between the working stations. The lifter part 18 includes a second group of lifters 22 having a plurality of second lifters 21 installed in the periphery of the blanking hole 13 for blanking the iron core piece 11 in the external form. In FIG. 1, the first and second lifters 19 and 21 are schematically shown in order to clarify an arrangement relation in the lower die 15.

Figure 2:
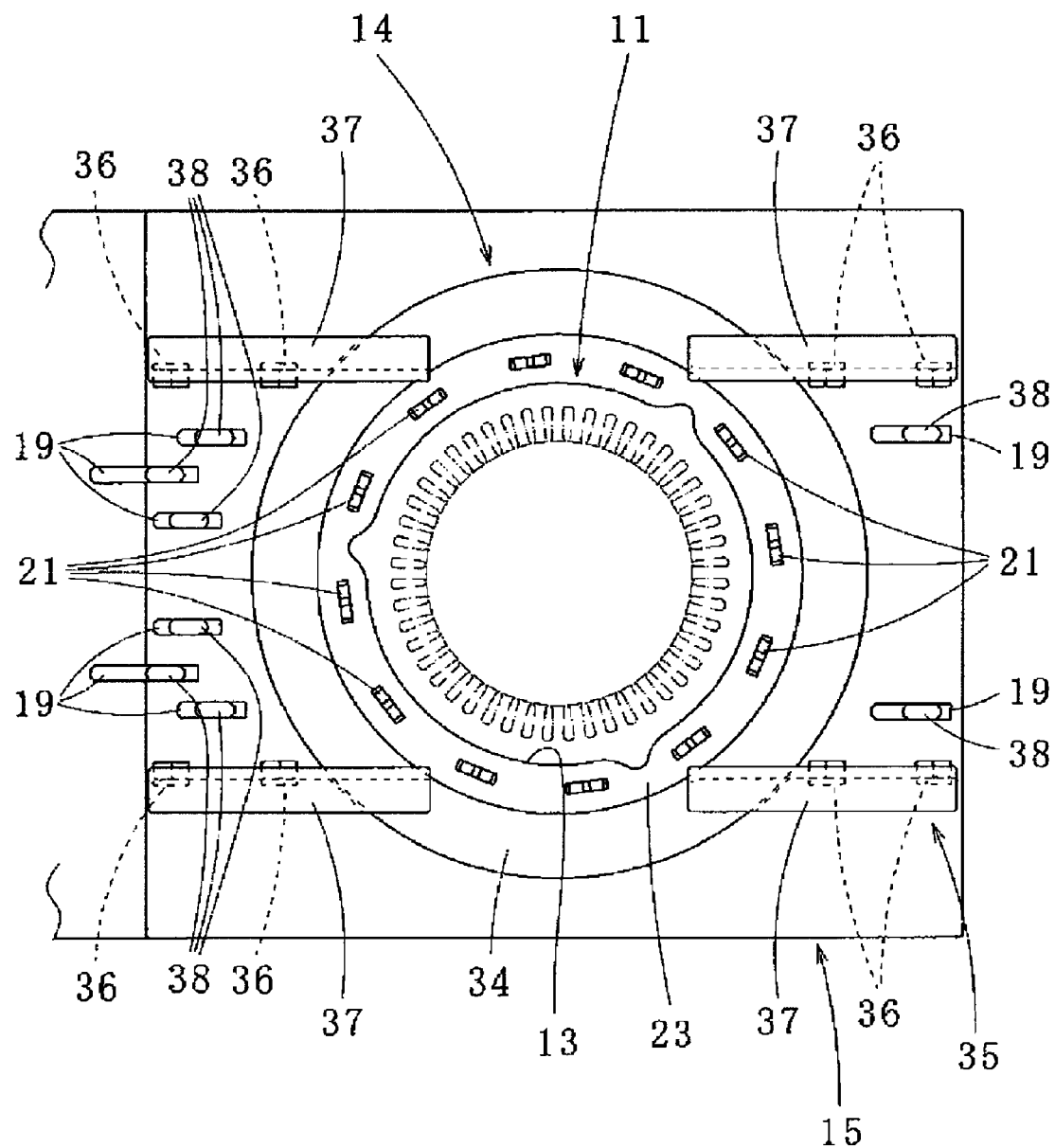
FIG. 2 is a plan view of a working station which blanks an iron core piece in an external form by the blanking die apparatus.
Figure 3:
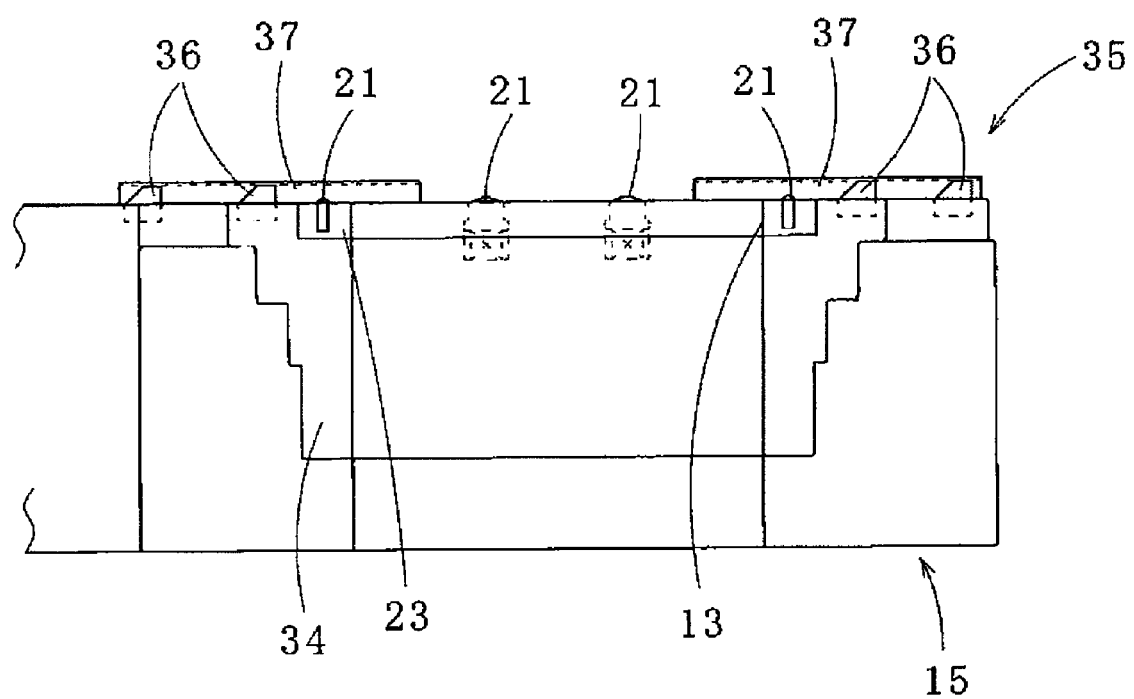
FIG. 3 is a side cross-sectional view of the working station which blanks the iron core piece in the external form by the blanking die apparatus.

Then, as shown in FIG. 2 and FIG. 3, the second lifters 21 are arranged in an annular way around the blanking hole 13 for blanking in the external form on an upper surface of a blank die 23 which has the blanking hole 13 for blanking in the external form provided on its central part. Further, a lifting height of the second lifter 21 is smaller than a lifting height of the first lifter 19.

Figure 4A:
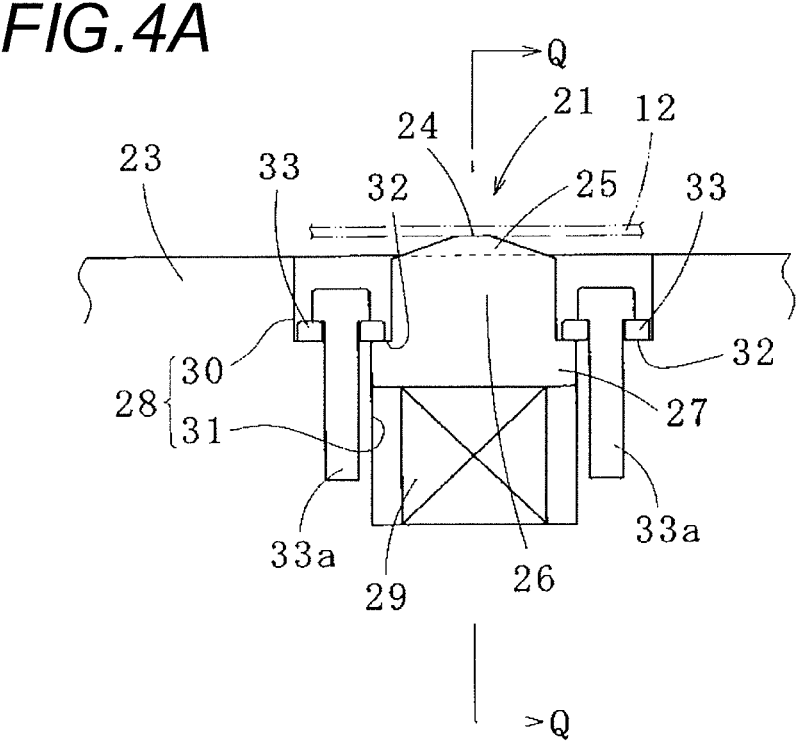
FIG. 4A is a side cross-sectional view of a second lifter.
Figure 4B:
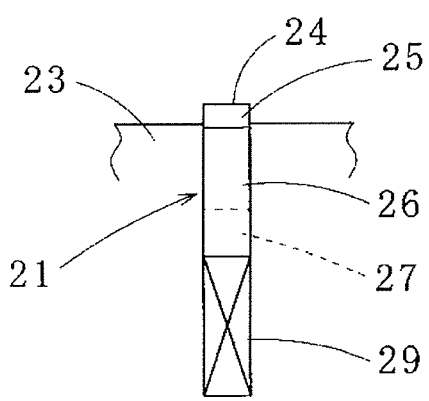
FIG. 4B is a cross-sectional view taken along a line Q-Q of FIG. 4A.
Figure 5:
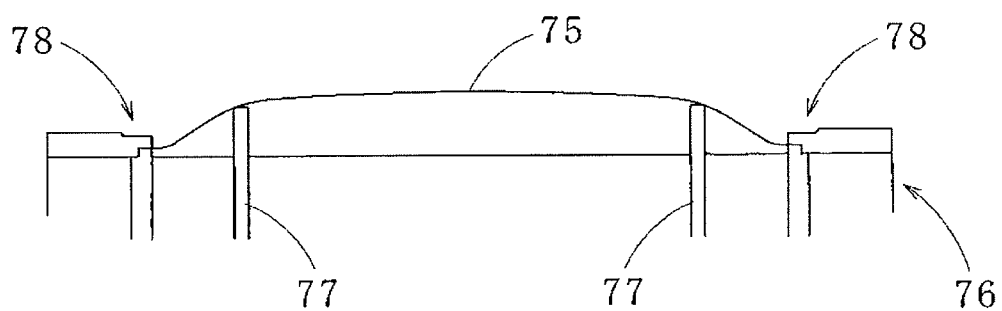
FIG. 5 is a front view showing a state where a sheet is lifted by lifters in a blanking die apparatus according to an example of the background art.
Figure 6:
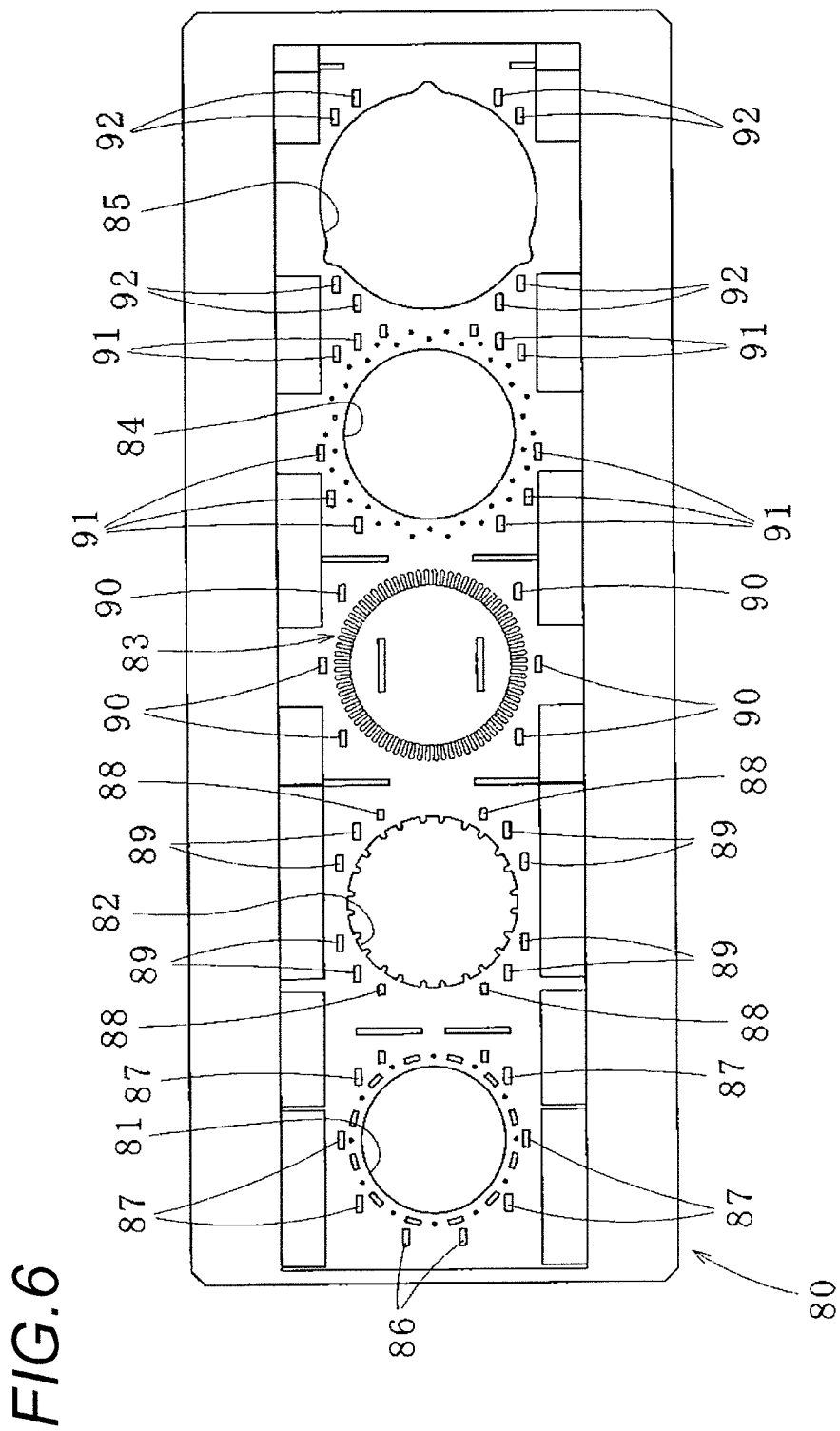
FIG. 6 is a plan view showing an arranged state of the lifters provided in the blanking die apparatus according to the example of the background art.

As shown in FIG. 4A, the second lifter 21 includes, in a side view, a mount part 25 of an equal leg trapezoidal form as one example of a trapezoidal form in which a width is gradually decreased toward a tip end part 24 of the mount part 25 in contact with the sheet 12, a support part 26 connected to a base side of the mount part 25 and having a prescribed width and a wide attaching part 27 connected to the support part 26. Further, as shown in FIG. 4B, the mount part 25, the support part 26 and the attaching part 27 are equal in their thickness. Only in the mount part 25, the thickness can be gradually decreased toward the tip end part 24 of the mount part 25, and the thickness of the mount part 25, the support part 26 and the attaching part 27 can be gradually decreased toward the tip end part 24 of the mount part 25.

The second lifters 21 are inserted into, for instance, rectangular lifter accommodating holes 28 in a plan view through springs 29 as one examples of a resilient member, which are equally arranged via spaces with their longitudinal directions directed to the circumferential direction on the upper surface of the blank die 23. Here, the lifter accommodating hole 28 is opened to the upper surface of the blank die 23 and includes a first accommodating part 30 wider than a width of the attaching part 27 and a second accommodating part 31 which communicates with a lower side of the first accommodating part 30 and has a width to which the attaching part 27 can be fitted.

Accordingly, as shown in FIG. 4A, the second lifter 21 is inserted into the lifter accommodating hole 28 and bolts 33a are screwed to a bottom surface 32 of the first accommodating part 30 through, for instance, a washer 33 to allow the washer 33 to abut on the bottom surface 32, so that both sides of the attaching part 27 in the longitudinal direction can be pressed toward a bottom of the second accommodating part 31. Thus, the spring 29 is allowed to be com-pressed so that the second lifter 21 may be attached to the lifter accommodating hole 28. As a result, the second lifter 21 can be urged upward (the upper die 17). When depths of the first and second accommodating parts 30 and 31 are set so as to meet the form of the second lifter 21, the mount part 25 of the second lifter 21 can protrude upward from the upper surface of the blank die 23. Thus, the sheet 12 can be constantly lifted upward from the upper surface of the blank die 23 through the second lifter 21. Further, when the iron core piece 11 is blanked in the external form, the second lifter 21 is pushed into the blank die 23 (the lower die 15) through the sheet 12 pressed by the stripper plate lowered together with the upper die 17 so as to allow the sheet 12 to abut on the blank die 23. When the stripper plate is lifted together with the upper die 17, the tip end side of the second lifter 21 is allowed to protrude from the blank die 23. Thus, the sheet 12 from which the iron core piece 11 is blanked and dropped can be lifted from the lower die 15.

As shown in FIG. 2, the first lifter 19 has a rectangular form in a plan view and is arranged in the lower die 15 in a longitudinal direction parallel to a forward direction or the progressively feeding direction of the sheet 12. Further, the first lifter 19 has a trapezoidal form in a side view in which a width is gradually decreased toward a tip end part of the first lifter 19 in contact with the sheet 12. In the first lifters 19, their lengths in the longitudinal direction are adjusted in accordance with their installed positions in order to arrange the sheet 12 so as to equally support the sheet 12. However, areas of first support parts 38 on which the first lifters 19 come into contact with the sheet 12 to mount the sheet 12 thereon are substantially the same. Accordingly, the sheet 12 is not caught by the tip end parts of the first lifters 19 and can be moved. Since a structure that the first lifter 19 is attached to the lower die 15 can be formed in the same way as that of, for instance, the second lifter 21, an explanation thereof will be omitted. Thus, the first lifter 19 can be urged upward. When a height dimension of the first lifter 19 is previously set, the tip end side of the first lifter 19 can be protruded upward by a prescribed height from the upper surface of the lower die 15. As a result, the sheet 12 can be constantly lifted upward by the prescribed height from the upper surface of the lower die 15. Further, when the iron core piece 11 is blanked in the external form, the first lifter 19 is pushed into the lower die 15 through the sheet 12 pressed by the stripper plate lowered together with the upper die 17 so as to allow the sheet 12 to abut on the lower die 15. When the stripper plate is lifted together with the upper die 17, the tip end side of the first lifter 19 is allowed to protrude from the lower die 15. Thus, the sheet 12 from which the iron core piece 11 is blanked and dropped can be lifted from the lower die 15.

An area of the tip end part 24 of the mount part 25 of the second lifter 21 which comes into contact with the sheet 12 is set to be smaller than the area of the first support part 38 with which the sheet 12 comes into contact in the first lifter 19. Thus, when the sheet 12 is lifted by the first and second lifters 19 and 21, even if the lifting height of the first lifter 19 is set to be larger than the lifting height of the second lifter 21, the sheet 12 can be stably supported (an own weight of the sheet 12 can be substantially supported by the first lifters 19). As a result, the own weight of the sheet 12 applied to the second lifter 21 is reduced, so that a frictional force generated in a contact part of the second lifter 21 and the sheet 12 can be reduced.

In FIG. 2 and FIG. 3, a blank die holder 34 is attached to the lower die 15 to hold the blank die 23. A guide part 35 prevents the progressively fed sheet 12 from shifting in a width direction. Here, the guide part 35 includes guide support parts 36 on which both sides of the sheet 12 in the width direction are respectively mounted and guide rails 37 which respectively abut on both end faces of the sheet 12 in the width direction. Since a structure that the guide support part 36 is attached to the lower die 15 can be formed in the same way as that of, for instance, the second lifter 21, an explanation thereof will be omitted. Thus, the guide support part 36 can be urged upward. When a height dimension of the guide support part 36 is previously set, a tip end side of the guide support part 36 can be protruded upward by the same height as that of the tip end side of the first lifter 19 from the upper surface of the lower die 15. As a result, through the guide support parts 36, both the sides of the sheet 12 in the width direction can be constantly lifted upward by the same height as that of the first lifter 19 from the lower die 15. The sheet 12 can be held in parallel (namely, horizontally) with the upper surface of the lower die 15. Further, when the iron core piece 11 is blanked in the external form, the guide support part 16 is pushed into the lower die 15 through the sheet 12 pressed by the stripper plate lowered together with the upper die 17 so as to allow the sheet 12 to abut on the lower die 15. When the stripper plate is lifted together with the upper die 17, the tip end side of the guide support part 36 is allowed to protrude from the lower die 15. Thus, both the sides of the sheet 12 in the width direction from which the iron core piece 11 is blanked and dropped can be lifted from the lower die 15.

In a method for manufacturing the laminated iron core by using the blanking die apparatus 10 according to one exemplary embodiment of the present invention, as shown in FIG. 1 to FIG. 3, the sheet 12 is progressively fed to the blanking die apparatus 10 which includes the lower die 15 in which are arranged the plurality of working stations for forming the patterns respectively having the blanking holes which form the patterns of the iron core pieces 11 that form the laminated iron core and the working station 14 including the blanking hole 13 for blanking in the external form the areas where the patterns are completed from the sheet 12 to form the iron core pieces 11; and the upper die 17 which moves upward and downward with respect to the lower die 15 and is opposed to the lower die 15 and arranged in the upper part of the lower die 15, and has the blanking punches respectively paired with the blanking holes of the plurality of working stations for forming the patterns and the blanking punch 16 paired with the blanking hole 13 for blanking in the external form in the working station 14. Then, the progressively fed sheet 12 is sequentially blanked or stamped out in each of the working stations for forming the patterns to form a desired pattern. Then, in the working station 14, the sheet 12 is blanked in the blanking hole 13 for blanking in the external form to obtain the iron core piece 11. The obtained iron core pieces 11 are rotated and stacked (one example of a lamination) in the lower die 15 to form the laminated iron core. Here, a rotating and stacking operation is carried out for each of the iron core pieces 11 or for some of the iron core pieces 11.

Then, in the lower die 15, are provided the lifter part 18 which lifts the sheet 12 from the upper surface position of the lower die 15 when the sheet 12 is progressively fed and the guide part 35 which prevents the progressively fed sheet 12 from shifting in the width direction. Further, the lifter part 18 includes the first group of lifters 20 having the plurality of first lifters 19 installed in the outer peripheral areas respectively in the plurality of working stations and the second group of lifters 22 having the plurality of second lifters 21 installed in the periphery of the blanking hole 13 for blanking the iron core piece 11 in the external form. A lifting distance (height) of the second lifter 21 is set to be shorter than a lifting distance of the first lifter 19. In a state where a part of the sheet 12 is supported by the second lifters 21, the iron core pieces 11 are rotated and stacked and the sheet 12 is progressively fed. Since the lifting height of the second lifter 21 is set to be smaller than the lifting height of the first lifter 19, the own weight of the sheet 12 applied to the second lifter 21 can be reduced. Thus, residue of the sheet can be prevented from being generated due to a mechanical damage such as scratches or abrasion in the contact parts of the second lifters 21 and the sheet 12. Thus, dents are prevented from being formed in the manufactured laminated iron core by the residue of the sheet, so that the laminated iron core with a high quality can be manufactured.

Further, since the second lifters 21 are arranged in the annular way around the blanking hole 13 for blanking in the external form on the upper surface of the blank die 23 which has the blanking hole 13 for blanking in the external form, a part of the sheet 12 in the vicinity of the hole which is formed by blanking the iron core piece 11 in the external form can be directly supported. Thus, an amount of bending of the sheet 12 which exists above the blanking hole 13 for blanking the iron core piece 11 in the external form can be assuredly reduced. Thus, even when the lifting height of the second lifter 21 is set to be shorter than the lifting height of the first lifter 19, the sheet 12 can be prevented from being caught in the blanking hole 13 for blanking in the external form. As a result, the productivity of the laminated iron core can be improved.

Further, since the own weight of the sheet 12 applied to the second lifter 21 is reduced, the second lifter 21 has, in a side view, the equal leg trapezoidal form in which the width is gradually decreased toward the tip end part 24 of the second lifter 21 in contact with the sheet 12 and the area that the second lifter 21 comes into contact with the sheet 12 is set to be smaller than the area of the lifter 19 which comes into contact with the sheet 12, the second lifter 21 can be smoothly moved relative to the sheet 12 during a rotating and stacking operation. Thus, a friction between the second lifter 21 and the sheet 12 can be reduced during the rotating and stacking operation, and a deformation (a swell or a bending) of the sheet 12 caused from the movement of the second lifter 21 (the frictional force between the second lifter 21 and the sheet 12) can be suppressed.

The present invention is described above by referring to the exemplary embodiments. However, the present invention is not limited to the structures described in the above-mentioned exemplary embodiments and may include other exemplary embodiments or modified examples which are considered within a range of matters described in claims. Further, combinations of component elements respectively included in the present exemplary embodiments and other exemplary embodiment or the modified examples may be included in the present invention.

For instance, the second lifters may be arranged in an annular manner around the blanking hole on an upper surface of the blank die holder which holds the blank die.

Further, the second lifter may have a circular arc shape in a side view which comes into contact with the sheet at one point.

What is claimed is:

1. A blanking die apparatus comprising:
  a lower die in which a plurality of working stations are arranged;
  an upper die which is opposed to the lower die, is arranged above the lower die and moves upward and downward with respect to the lower die; and a mechanism which sequentially blanks or stamps out a progressively-fed sheet respectively in the working stations to form iron core pieces of a desired form, and then laminates the iron core pieces to form a laminated iron core, wherein the lower die includes a lifter part which lifts the sheet from an upper surface position of the lower die when the sheet is progressively fed, the lifter part including:

a first group of lifters that includes first lifters installed in an outer peripheral area in each of the working stations; and a second group of lifters that includes second lifters installed on an upper surface of a blank die which has a blanking hole formed for blanking the iron core pieces in an external form, or on an upper surface of a blank die holder which holds the blank die, wherein the second group of lifters are positioned closer to an outer periphery of the blanking hole than the first group of lifters, and wherein a lifting height of the second group of lifters is smaller than a lifting height of the first group of lifters.

2. The blanking die apparatus according to claim 1, wherein
the second lifters are arranged in an annular way around the blanking hole.

3. The blanking die apparatus according to claim 1, wherein
an area of a second lifter, among the second lifters, which comes into contact with the sheet is smaller than an area of a first lifter, among the first lifters, which comes into contact with the sheet.

4. The blanking die apparatus according to claim 1, wherein
a second lifter, among the second lifters, has, in a side view, a trapezoidal form in which a width is decreased toward a tip end part of the second lifter abutting on the sheet or a circular arc shape which comes into contact with the sheet at one point.

5. The blanking die apparatus according to claim 1, wherein
the iron core pieces are rotated and stacked for each of the iron core pieces or for some of the iron core pieces.

6. A method for manufacturing a laminated iron core, the method comprising:

progressively feeding a sheet to a blanking die apparatus including a lower die in which a plurality of working stations are arranged and an upper die which is opposed to the lower die, is arranged above the lower die and moves upward and downward with respect to the lower die;

sequentially blanking or stamping out the sheet respectively in the working stations to form iron core pieces of a desired form, and then laminating the iron core pieces to form a laminated iron core, wherein the lower die includes a lifter part which lifts the sheet from an upper surface position of the lower die when the sheet is progressively fed and a guide part which prevents the progressively-fed sheet from shifting in a width direction of the sheet, and the lifter part includes a first group of lifters including first lifters installed in an outer peripheral area in each of the working stations and a second group of lifters including second lifters installed in a periphery of a blanking hole for blanking the iron core pieces in an external form so that the sheet is progressively fed in a state where a part of the sheet is supported by the second lifters, providing the second group of lifters to be positioned closer to the periphery of the blanking hole than the first group of lifters, and providing a lifting height of the second group of lifters to be smaller than a lifting height of the first group of lifters.

7. The method according to claim 6, wherein
the second lifters are arranged in an annular way around the blanking hole on an upper surface of a blank die having the blanking hole or on an upper surface of a blank die holder which holds the blank die.

8. A blanking die apparatus comprising:

a lower die in which a plurality of working stations are arranged;

an upper die which is opposed to the lower die, is arranged above the lower die and moves upward and downward with respect to the lower die; and a mechanism which sequentially blanks or stamps out a progressively-fed sheet respectively in the working stations to form iron core pieces of a desired form, and then laminates the iron core pieces to form a laminated iron core, wherein the lower die includes a lifter part which lifts the sheet from an upper surface position of the lower die when the sheet is progressively fed, the lifter part including:

a first group of lifters that includes first lifters installed in an outer peripheral area in each of the working stations; and a second group of lifters that includes second lifters installed on an upper surface of a blank die which has a blanking hole formed for blanking the iron core pieces in an external form, or on an upper surface of a blank die holder which holds the blank die, wherein the blank die is configured to rotate so as to rotate and stack the iron core pieces, and wherein, when the blank die rotates, the second lifters rotate together.

* * * * *

UNITED STATES PATENT AND TRADEMARK OFFICE
CERTIFICATE OF CORRECTION

PATENT NO.           : 9,887,038 B2
APPLICATION NO.      : 14/574844
DATED                : February 6, 2018
INVENTOR(S)          : S. Yamato Page 1 of 1

It is certified that error appears in the above-identified patent and that said Letters Patent is hereby corrected as shown below:

On the Title Page

Item (57) Abstract (Column 2, Line 21), please change "the" to --die-- after upper.

Signed and Sealed this
Twenty-fifth Day of September, 2018

Andrei Iancu
*Director of the United States Patent and Trademark Office*